United States Patent [19]
Mercorelli et al.

[11] 3,718,990
[45] March 6, 1973

[54] WORD AND CHARACTER RECOGNITION APPARATUS

[76] Inventors: Pat A. Mercorelli, 9 Duane Place, Bloomfield, N.J. 07003; John N. Mercorelli, 1265 Van Houten Avenue, Clifton, N.J. 07000

[22] Filed: Feb. 16, 1971

[21] Appl. No.: 115,510

[52] U.S. Cl. ................................................35/35 D
[51] Int. Cl. ............................................G09b 17/00
[58] Field of Search .........35/35 R, 35 D, 35 F, 35 G, 35/77, 5, 6, 9 R, 73

[56] References Cited

UNITED STATES PATENTS

| | | | |
|---|---|---|---|
| 1,351,608 | 8/1920 | Barry | 35/6 |
| 166,382 | 8/1875 | Irrgang | 35/73 |
| 2,907,123 | 10/1959 | McMahon | 35/35 F |

*Primary Examiner*—Wm. H. Grieb
*Attorney*—Cifelli, Behr & Rhodes

[57] ABSTRACT

Educational and game apparatus, particularly useful for teaching spelling and word recognition and for providing entertainment, including a plurality of first indicia, e.g. words, and a plurality of second indicia, e.g. pictures corresponding to objects described by such words, if words and pictures are utilized, the words are provided with designations, e.g. numbers, a word is selected and the word is spelled out letter by letter, e.g. by means of a rotatable dial, the pictures are concealed during the spelling out process and after the selected word has been spelled out properly the picture corresponding to the object described by the selected word will be moved into a predetermined position corresponding to the designation (number) of the selected word and upon movement of structure concealing the corresponding picture, such picture will be exposed to visibly indicate that the selected word has been spelled properly.

16 Claims, 4 Drawing Figures

PATENTED MAR 6 1973

INVENTORS
JOHN N. MERCORELLI
PAT A. MERCORELLI
BY
Cifelli, Behr & Rhodes
ATTORNEYS

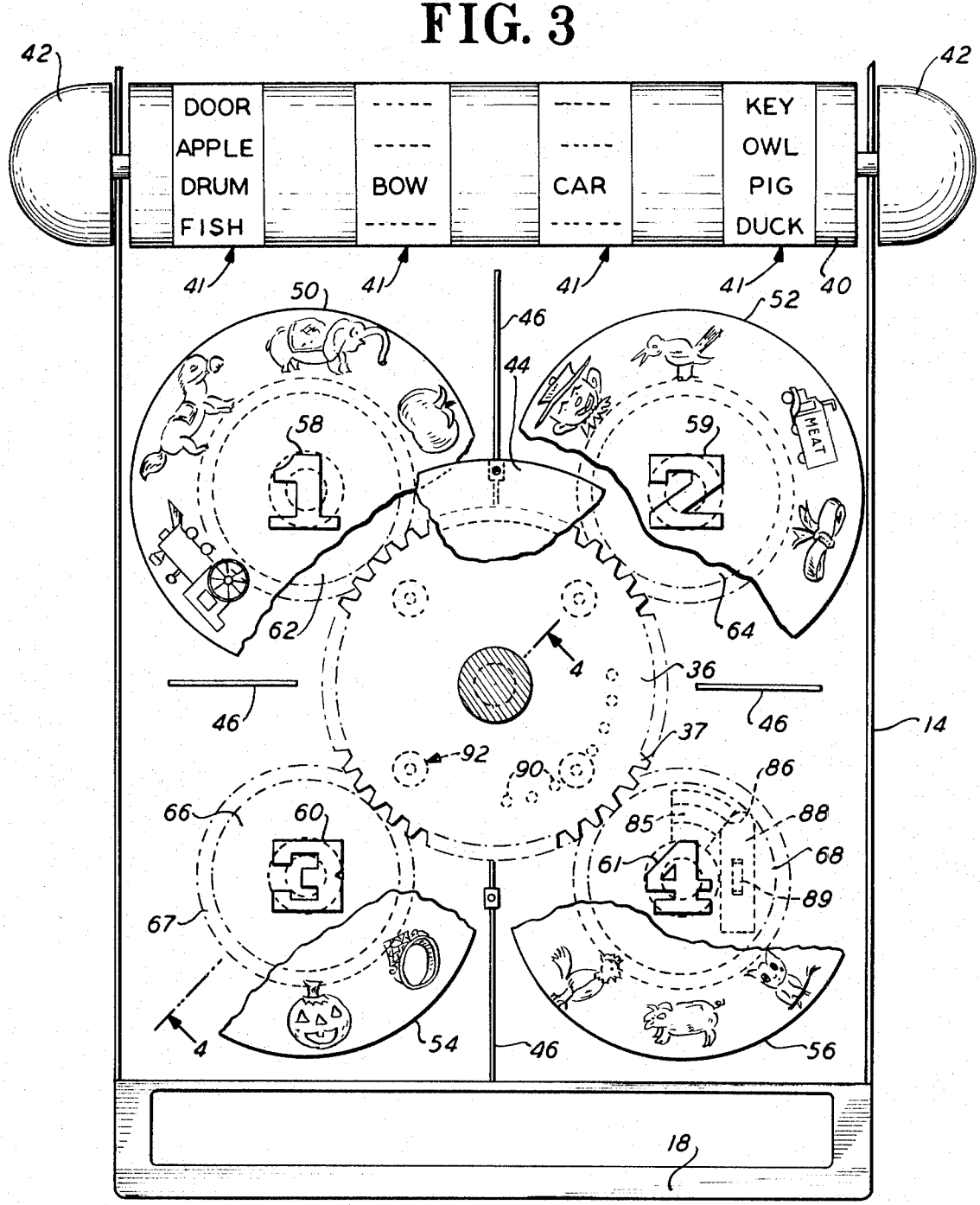

WORD AND CHARACTER RECOGNITION APPARATUS

BACKGROUND OF THE INVENTION

1. Field of the Invention

This invention relates to new and useful improvements in educational apparatus, or game apparatus, and is specifically directed to novel apparatus especially adapted to assist a child or other user in learning and improving his skill in reading, spelling, word recognition and the like, and while performing its educational function, the apparatus may provide a source of recreation and entertainment.

The apparatus is particularly useful in entertaining children and in training young minds to associate words describing objects with pictures of the objects. In the process of association a selected word is spelled out letter by letter while the associated picture is concealed. Suspense is built up in the mind of a user during the spelling process and a sense of self-satisfaction and entertainment is provided to the user upon the exposure of the picture to indicate proper spelling of the selected word.

The educational subject matter may be substantially infinitely varied, for example, the subject matter may be words and pictures, arithmetic questions and answers, etc.

2. Description of the Prior Art

The prior art is replete with many and varied educational and game devices, for example, such devices as disclosed in U.S. Pat. Nos. 1,500,196, 1,551,125, 2,655,738, 2,805,069, 2,831,691, and 2,907,123; and Italian Pat. No. 370,019

While such prior art educational apparatus and games may be said to be generally satisfactory for their intended purpose, none of such prior art devices provides the flexibility, extensiveness of subject matter, simplicity of operation, and sense of suspense and satisfaction to the user as is provided by the present invention.

Summary of the Invention

The primary object of the present invention is to provide new and improved educational apparatus simple in its operation, flexible and extensive in the subject matter presented, and capable of providing a sense of suspense, enjoyment and self-satisfaction to the user in addition to the provision of an educational function.

A further object of the present invention is to provide educational apparatus which in addition to entertaining the user, combines the educational features of reading, spelling, word recognition and an improvement in manual skills.

The foregoing objects are accomplished by educational apparatus embodying the present invention which apparatus may include means providing a first plurality of indicia; variable means operable in accordance with a predetermined one of said plurality of indicia; indicating means providing a second plurality of indicia corresponding to the first plurality of indicia, such indicating means operable in response to the variable means and movable into a predetermined position upon the operation of the variable means; and means for concealing the indicating means during the operation of the variable means and operable upon the conclusion of the operation of the variable means to expose a predetermined one of the second plurality of indicia.

DESCRIPTION OF THE DRAWINGS

FIG. 3 is a fragmentary view of FIG. 1 with parts broken away to show various detailed structure; and FIG. 4 is a sectional view taken substantially along the line 4—4 of FIG. 3 in the direction of the arrows.

DETAILED DESCRIPTION OF THE DRAWINGS

Figure 1:
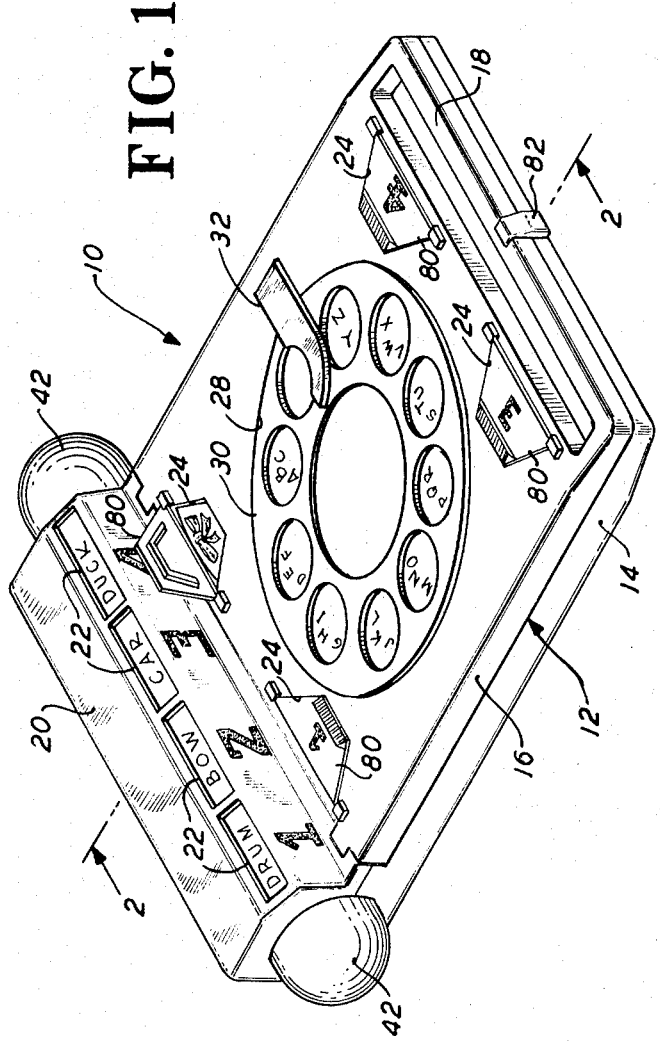
FIG. 1 is a perspective view of a presently preferred embodiment of the present invention.
Figure 2:
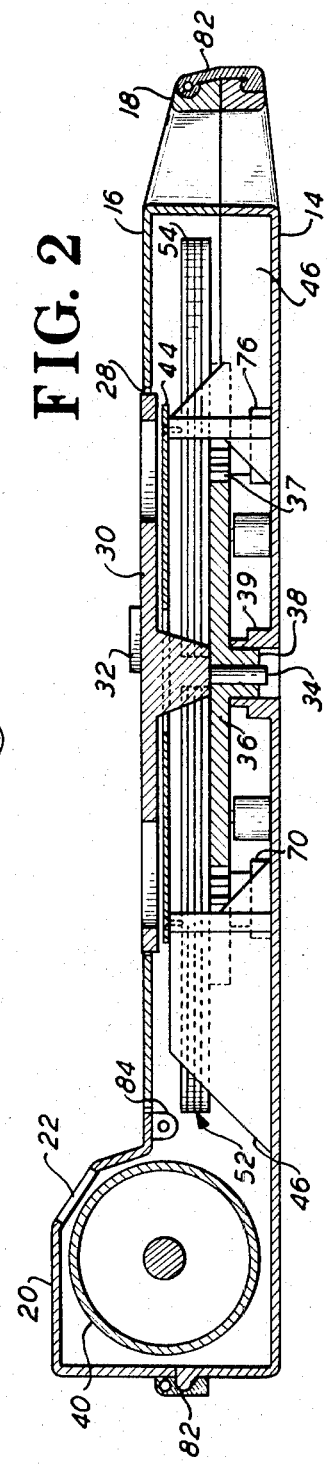
FIG. 2 is a sectional view taken substantially along the line 2—2 in FIG. 1, in the direction of the arrows.

Referring now to FIG. 1, there is shown educational apparatus embodying the present invention and indicated generally by the numerical designation 10. The apparatus includes a housing 12 including a lower portion 14 and an upper portion 16. The lower housing portion 14, as shown in FIGS. 1 and 2, is generally flat having upwardly extending side and end portions, the rightward portion being formed into the lower half of a carrying handle indicated generally by the numerical designation 18. The upper housing portion 16 is generally flat with the leftward portion thereof being raised and formed into a cavity portion 20 having a first plurality of openings or windows 22 formed therein. The rightward portion of the upper housing portion 16 is formed into the complementary upper half of the carrying handle 18. The upper housing portion 16 is also provided with a second plurality of openings or windows 24 formed therein. In addition, the upper housing portion 16 is also provided with a generally centrally formed circular opening 28 for accommodating a finger wheel or dial 30. Suitably secured to the upper surface of the upper housing portion 16, or formed integrally therewith, is a finger stop 32 for the dial 30.

Referring again to the leftward portions of FIGS. 1 and 2, the lower housing portion 14 and the cavity portion 20 of the upper housing portion 16 accommodate a cylinder 40 which is suitably mounted for rotation, for example, in split circular bearing surfaces, not shown, formed in opposed relationship in the lower and upper housing portions 14 and 16, respectively. As may be best seen in FIGS. 1 and 3, the outer cylindrical surface of the rotatable cylinder 40 is provided with a plurality of circular rows 41 of indicia, such as, for example, circular rows of words describing, or being the names of, various objects, articles or animals. As may be best seen in FIG. 1, upon rotation of the cylinder 40 by the knobs 42 provided on either end thereof, the circular rows of indicia are selectively viewable or exposable through the plurality of windows 22 formed in the cavity portion 20 of upper housing portion 16.

Referring again to the dial 30, and in particular to FIG. 2, the dial is provided with an integrally formed spline portion 34 which is suitably keyed to a main gear 36 provided with a plurality of peripherally formed teeth 37 (FIG. 3). The main gear is provided with a journal portion 38 which is received for bi-directional rotation within a bearing member 39 secured to, or formed integrally therewith, the upper surface of lower housing portion 14. Thus, it will be understood, that the dial 30 is removably secured to the main gear 36 for bi-directional rotation with the main gear.

Mounted below the dial 30 is a circular member 44 provided with a plurality of groupments of letters of the alphabet as shown in FIG. 1, which groupments are disposed around the perimeter of the member 44, and are visible through the correspondingly spaced finger holes formed in the dial or finger wheel 30. The circular member 44 is suitably secured to, such as by threaded fasteners as shown (FIGS. 2 and 3), rib members 46 suitably secured to, or formed integrally therewith, the top surface of lower housing portion 16.

Referring now primarily to FIG. 3, a plurality of indicating means or discs 50, 52, 54 and 56 are provided on their upper surfaces with a plurality of radially arranged pictures of objects, articles or animals corresponding to the circular rows of words provided on the surface of the rotatably mounted cylinder 40. The discs are respectively removably secured to a plurality of peripheral gears 62, 64, 66 and 68. The discs are provided with centrally formed openings complementary to the splines secured to, or formed integrally therewith, the upper surface of the peripheral gears; for convenience of association and assembly, the openings and splines may be formed in the shape of numbers. As may be best seen in FIGS. 2 and 4, the peripheral gears are provided with journal portions 65 received for bi-directional rotation within bearing members 70 suitably secured to, or formed integrally therewith, the upper surface of lower housing portion 14. As is shown representatively of all peripheral gears, the peripheral gear 66 of FIG. 4 is provided with teeth 67 formed around the periphery thereof which teeth are engageable with the teeth 37 of the main gear 36. Thus, it will be understood, that bi-directional rotation of the dial 30 and main gear 36 imparts corresponding bi-directional rotation to the peripheral gears 62–68 and the discs 50–56.

Referring again to FIG. 1, and in particular to the plurality of openings or windows 24 formed in the upper housing portion 16, it will be understood that the idicia or pictures formed on the discs 50–56 would be respectively visible sequentially through the correspondingly associated openings 24 upon rotation of the discs. However, it will be noted that each opening is provided with a pivotally mounted shutter 80 for normally shutting or closing off the opening and thereby normally concealing the pictures provided on the discs 50–56.

It will be noted from FIG. 1, that the windows 22, and hence the respective words exposed therethrough, are provided with numerical designations (1, 2, 3 and 4), and that the shutters 80 are also provided with the same numerical designations; the reason for this correlation becoming more clearly understood as set forth in the following detailed description of operation.

Referring again to FIGS. 1 and 2, it will be noted that the upper and lower housing portions 14 and 16 are provided at either ends with catches or fasteners 82 for removably securing the housing portions together. It will be further noted that the upper housing portion 16 is articulated, the right ward portion being mounted pivotally with respect to the cavity portion 20 by means of suitable pivot means 84. This articulation permits easy access to the interior of the housing 12, and in particular provides convenient assembly of the discs 50–56 with the peripheral gears 62–68.

It will be further noted and shown in FIGS. 2 and 4, that the plurality of discs 50–56 are also pluralities or stacks of discs. This provides another feature of the present invention in that the background of various portions of the surface of the rotatable cylinder 40 may be of different colors, and the background colors of the discs in each stack of discs may be correspondingly colored. Thus further educational and entertainment aspects of the present invention are provided in the color coordinated assembly of the discs and the use of the words provided in the correspondingly colored portion of the cylinder 40.

Referring again to FIG. 3, it will be noted that peripheral gear 68 is provided with a beveled portion 85 having a stop surface 86 which upon the clockwise rotation of the peripheral gear 68 (counter-clockwise rotation of dial 30) is engageable with a pivotally mounted stop member 88, which member 88 is mounted pivotally on a stationary post 89 suitably secured to the top surface of lower housing portion 14. Upon counter-clockwise rotation of peripheral gear 68 (clockwise rotation of dial 30) the stop member 88 is pivoted downwardly by the beveled portion 85 out of engagement with the peripheral gear 68. Thus, it will be understood that the pivotally mounted stop member 88 and associated beveled gear portion 85 and stop surface 86 permit only limited clockwise rotation of the peripheral gears 62–68 and discs 50–56 and limited counter-clockwise rotation of the dial 30 and main gear 36, but also permit free unlimited rotation of the peripheral gears and discs in the counter-clockwise direction and free, rotation of the dial 30 and main gear 36 in the clockwise It will be further understood that the above- described predetermined color coordinating of the words to be selected from on the surface of the cylinder 40 and the top most disc in the stack of discs 50–56 will assure that all the words available for selection from the chosen color area on the cylinder 40 will have corresponding pictures thereof available on the top most discs and such pictures will be available for exposure through the respectively associated openings or windows 24. It will be further understood that such limited and unlimited rotational movements, coupled with the selective and predetermined keying of the discs 50–56 to the peripheral gears 62–68, assures that upon rotation of the dial 30 in the counter-clockwise direction and the engagement of the pivotal stop member 88 with the stop surface 86, predetermined ones of the pictures formed on the discs 50–56 will be brought into predetermined initial registration with the plurality of windows or openings 24; and that such afore-described structural assembly relationships assure that upon the predetermined amount of rotation of the dial 30 in the clockwise direction, predetermined ones of the pictures will be brought into predetermined registration with the openings or windows 24. Thus, it will be further understood, that by properly chosing the words in the selected colored areas on the rotatable cylinder 40 in accordance with the amount of rotation to be imparted to the dial 30 upon the rotation of the dial in the letter-by-letter spelling out of the words as determined by the radial positioning of the alphabet groupments of letters on the circular member 44, the various pictures provided on the discs 50–56 can be moved into predetermined registration with the openings or windows 24, and more particularly, a predetermined picture can be brought into registration with a particular window 24 in accordance with the numerical designations of the shutter 80 associated with the particular window and in accordance with the associated numerically designated window 22 through which the associated word is visible or is exposed.

OPERATION

The educational apparatus of the present invention is operated as follows, the top most disc in each stack of discs in color coordinated, in the manner as described above with the correspondingly colored area of the surface area of the rotatable cylinder 40 from which a word is to be selected, and the shutters 80 are pivoted downwardly thereby closing the window 24 and concealing the pictures presented on the discs 50–56. The dial 30 is rotated in the counter-clockwise direction until its counter-clockwise movement is limited or halted by the stop member 88 as described above. A word is then selected from the chosen colored area of the cylinder 40 by rotation of the cylinder by means of the knobs 42 until the selected word appears in one of the numerically identified windows 22, thus the selected word is provided with a numerical designation. The selected word is then spelled out letter by letter by the manual clockwise rotation of the dial 30, in the familiar manner, i.e., by the insertion of the finger in the finger wheel openings over the appropriate letters provided in the alphabet groupments and the rotation of the dial until finger is brought into engagement with the stop 32 to impart sequential clockwise rotations to the dial 30 and, counter-clockwise rotations to the discs 50–56, as the selected word is spelled out letter by letter. (It will be expressly understood that in the letter-by-letter spelling of the selected word, the dial 30 is only rotated clockwise in sequential, clockwise rotational movements, the dial is not rotated counter-clockwise after each letter is dialed, the dial is only rotated counter-clockwise before the beginning of the spelling or dialing of a word.) Upon the completion of the letter-by-letter spelling or dialing of the selected word, assuming it has been properly spelled or dialed, the picture corresponding to the selected word will be in registration with the window 24 whose associated shutter 80 has the same numerical designation as the numerically designated window 22 through which the selected word is visible or is exposed. The associated numerically designated shutter is then pivoted upwardly to reveal the picture of the object, article or animal associated with the selected word. Such picture revelation indicates to the user of the educational apparatus that the selected word has been properly spelled thus providing spelling training, word recognition and picture-word association, and entertainment to the user.

Referring again to FIG. 4, the apparatus may further include means for providing step-by-step rotational movement to the finger wheel or dial 30 so as to provide more positive control over the operation of the dial. More particularly, the lower surface of the main gear 36 may be provided with a plurality of discrete, circularly arranged, concave depression 90. One or more (two being shown) spring mounted ball detents indicated generally by numerical designations 92 may be provided with the spring mounted balls thereof being sequentially engageable with the depressions 90 as the dial 30 is rotated. Such sequential engagement prevents unwanted or negligent operation of the dial and assures that once the discs 50–56 (and hence the pictures provided thereon) have been brought into proper registration with the openings 24, such registration is maintained and not lost by unintentional or negligent rotation of the dial 30.

It will be understood by those skilled in the art that various other indicia could be utilized in the practice of the present invention other than words and associated pictures, in particular, it will be understood that pictures could be provided on the cylinder 40 and the word associated with the picture could then be spelled out or dialed and if done so properly, the associated word would appear at the appropriately numerically designated window.

It will be further understood that the above-described embodiment of the present invention is merely illustrative of the present invention and that various embodiments thereof may be devised without departing from the spirit and scope of the present invention.

What is claimed is:

1. Educational apparatus comprising:
    means providing a first plurality of indicia,
    variable means operable in accordance with a predetermined one of said plurality of indicia,
    indicating means providing a second plurality of indicia corresponding to said first plurality of indicia, said indicating means comprising a plurality of rotatably mounted discs operable in response to said variable means and movable into a predetermined position upon the operation of said variable means, and
    means for concealing said indicating means during the operation of said variable means and operable upon the conclusion of the operation of said variable means to expose a predetermined one of said second plurality of indicia.

2. Apparatus according to claim 1 wherein said means providing said first plurality of indicia comprises: housing means providing a first plurality of windows, and a cylinder mounted rotatably in said housing means and having a plurality of rows of said first plurality of indicia provided on the surface thereof which rows of indicia are exposable respectively through said first plurality of windows.

3. Apparatus according to claim 2 wherein said variable means comprises a rotatably mounted finger wheel.

4. Educational apparatus comprising:
    means providing a first plurality of indicia comprising:
    housing means providing a first plurality of windows, and
    a cylinder mounted rotatably in said housing means and having a plurality of rows of said first plurality of indicia provided on the surface thereof which rows of indicia are exposable respectively through said first plurality of windows,
    variable means comprising a rotatably mounted finger wheel operable in accordance with a predetermined one of said plurality of indicia, indicating means providing a second plurality of indicia corresponding to said first plurality of indicia, said indicating means comprising a plurality of rotatably mounted discs operable in response to the rotation of said finger wheel to move into predetermined positions, said discs having said second plurality of indicia provided radially on one surface thereof, and means for concealing said indicating means during the operation of said variable means and operable upon the conclusion of the said variable means to expose a predetermined one of said second plurality of indicia.

5. Apparatus according to claim 4 wherein said surfaces of said discs are provided with a background color and wherein various portions of said surface of said rotatably mounted cylinder are provided with various background colors, the background color of said discs corresponding to one of said background colors of said cylinder.

6. Apparatus according to claim 4 wherein said housing means also provides a second plurality of windows for exposing said second plurality of indicia, and wherein said means for concealing said indicating means comprises pivotally mounted closure means associated with each window of said second plurality of windows.

7. Apparatus according to claim 6, further including means for providing initial registration between said second plurality of indicia and said second plurality of windows upon the rotation of said finger wheel in a predetermined direction.

8. Educational apparatus comprising: means providing pluralities of first indicia, each plurality of said first indicia identifiable in accordance with a predetermined designation;

variable means operable in accordance with a selected one of said first indicia;

a plurality of indicating means comprising rotatably mounted discs providing pluralities of second indicia corresponding to said pluralities of first indicia and operable in response to the operation of said variable means, upon the operation of said variable means, one of said rotatably mounted discs movable into a predetermined position corresponding to said selected one of said first indicia; and a plurality of concealing means respectively identifiable in accordance with said predetermined designations, said concealing means for concealing said second indicia during the operation of said variable means and one of said concealing means operable upon the conclusion of the operation of said variable means to expose a predetermined one of said second indicia corresponding to said selected one of said first indicia to indicate proper operation of said variable means in accordance with said selected one of said first indicia.

9. Apparatus according to claim 8 wherein said means providing said plurality of first indicia comprises:

housing means providing a first plurality of windows, a cylinder mounted rotatably in said housing means and having said pluralities of first indicia provided on the surface thereof in the form of circular rows of indicia which rows are exposable respectively through said first plurality of windows.

10. Educational apparatus comprising:

means providing pluralities of first indicia comprising housing means providing a first plurality of windows, a cylinder mounted rotatably in said housing means and having said pluralities of first indicia provided on the surface thereof in the form of circular rows of indicia which rows are exposable respectively through said first plurality of windows, each plurality of said first indicia identifiable in accordance with a predetermined designation;

variable means operable in accordance with a selected one of said first indicia, comprising a finger wheel having a plurality of openings formed around the periphery thereof, a member mounted below said finger wheel and having a plurality of groupments of third indicia, corresponding to said first indicia, provided around the periphery thereof, said third indicia visible through said finger wheel openings, a finger stop for said finger wheel, a main gear mounted for bi-directional rotation, and said finger wheel removably secured to said main gear for rotation therewith a plurality of indicating means providing pluralities of second indicia corresponding to said pluralities of first indicia and operable in response to the operation of said variable means one of said indicating means movable into a predetermined position corresponding to said selected one of said first indicia; and a plurality of concealing means respectively identifiable in accordance with said predetermined designations, said concealing means for concealing said second indicia during the operation of said variable means and one of said concealing means operable upon the conclusion of the operation of said variable means to expose a predetermined one of said second indicia corresponding to said selected one of said first indicia to indicate proper operation of said variable means in accordance with said selected one of said first indicia.

11. Apparatus according to claim 10 wherein said housing means also provides a second plurality of windows and wherein said plurality of indicating means comprises:

a plurality of discs having said pluralities of second indicia respectively provided radially around one surface thereof, and a plurality of peripheral gears mounted for bi-directional rotation and engageable with said main gear for rotation therewith, said discs respectively associated with predetermined ones of said peripheral gears and removably secured to said peripheral gears for rotation therewith.

12. Apparatus according to claim 10 further including means limiting the rotation of said finger wheel in one direction to provide initial registration between said second indicia and said second plurality of windows; and for permitting free, unlimited rotation of said finger wheel in the opposite direction.

13. Apparatus according to claim 11 wherein one of said peripheral gears is provided with a stop surface, and wherein said apparatus further includes a pivotally mounted stop member engageable with said stop surface to limit the rotation of said one peripheral gear in one direction and thereby limit the rotation of said finger wheel in one direction, upon the rotation of said finger wheel and said one peripheral gear in directions opposite to said one direction said stop member permitting the free unlimited rotation of said gear and finger wheel in said opposite directions.

14. Apparatus according to claim 10 further including means providing a step-by-step rotational movement to said finger wheel.

15. Apparatus according to claim 10 wherein said main gear is provided with a plurality of discrete, circularly arranged, concave depressions formed in one surface thereof, and wherein said apparatus further includes at least one spring mounted, ball detent engageable with said depressions upon the rotation of said main gear to provide step-by-step movement to said finger wheel upon the rotation thereof.

16. Apparatus according to claim 10 wherein said first indicia is a plurality of words and said second indicia is a plurality of pictures corresponding to said words.

* * * * *